US011700517B2

United States Patent
Zhao et al.

(10) Patent No.: US 11,700,517 B2
(45) Date of Patent: Jul. 11, 2023

(54) LOCATION REPORTING FOR SERVICE ENABLER ARCHITECTURE LAYER (SEAL)

(71) Applicant: TENCENT AMERICA LLC, Palo Alto, CA (US)

(72) Inventors: Shuai Zhao, Pleasanton, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 100 days.

(21) Appl. No.: 17/499,601

(22) Filed: Oct. 12, 2021

(65) Prior Publication Data

US 2022/0329996 A1 Oct. 13, 2022

Related U.S. Application Data

(60) Provisional application No. 63/172,050, filed on Apr. 7, 2021.

(51) Int. Cl.
*H04W 4/50* (2018.01)
*H04W 4/40* (2018.01)
(Continued)

(52) U.S. Cl.
CPC ............. *H04W 4/50* (2018.02); *H04W 4/029* (2018.02); *H04W 4/06* (2013.01); *H04W 4/40* (2018.02)

(58) Field of Classification Search
CPC ... H04W 28/0268; H04W 80/02; H04W 4/08; H04W 4/029; H04W 4/70; H04W 24/08; H04W 76/19
See application file for complete search history.

(56) References Cited

U.S. PATENT DOCUMENTS 11,172,019 B1 * 11/2021 Zhao ................. H04W 28/0268
11,252,547 B2 * 2/2022 Pattan ................. H04L 41/5058
(Continued)

FOREIGN PATENT DOCUMENTS

WO  WO-2022182118 A1 * 9/2022
WO  WO-2022246429 A1 * 11/2022 ............ H04W 4/029

OTHER PUBLICATIONS

S. P. Shah, B. J. Pattan, N. Gupta, N. D. Tangudu and S. Chitturi, "Service Enabler Layer for 5G Verticals," 2020 IEEE 3rd 5G World Forum (5GWF), Bangalore, India, 2020, pp. 269-274, doi: 10.1109/5GWF49715.2020.9221425. (Year: 2020).*

*Primary Examiner* — William D Cumming
(74) *Attorney, Agent, or Firm* — ArentFox Schiff LLP

(57) ABSTRACT

A method of a service enabler architecture layer (SEAL) can include receiving a location reporting configuration at a first user equipment (UE) from a location management server of the SEAL. The location reporting configuration can indicate at least one location reporting event for triggering a first location information report from a first location management client at the first UE to the location management server. The first location information report can be transmitted to the location management server from the first location management client at the first UE in response to the at least one location reporting event occurring. The first location information report can include an identity of the first UE, an identity of the at least one location reporting event that triggers the first location information report, first location information of the first UE, and a first timestamp corresponding to the first location information of the first UE.

20 Claims, 9 Drawing Sheets

(51) Int. Cl.
  *H04W 4/029*   (2018.01)
  *H04W 4/06*    (2009.01)

(56) References Cited

U.S. PATENT DOCUMENTS

| | | | | |
|---|---|---|---|---|
| 11,533,345 B2* | 12/2022 | Shah | ........................ | H04W 8/18 |
| 11,602,006 B2* | 3/2023 | Balasubramanian | ... | H04W 4/70 |
| 2020/0178052 A1* | 6/2020 | Pattan | ................. | H04L 41/5051 |
| 2021/0227619 A1* | 7/2021 | Balasubramanian | ... | H04W 4/70 |
| 2022/0103991 A1* | 3/2022 | Pattan | .................... | H04W 80/12 |
| 2022/0109964 A1* | 4/2022 | Pattan | ..................... | H04W 4/08 |
| 2022/0329635 A1* | 10/2022 | Zhao | .................... | H04L 65/1069 |
| 2022/0329996 A1* | 10/2022 | Zhao | ..................... | H04W 4/029 |
| 2022/0330303 A1* | 10/2022 | Zhao | ..................... | H04W 24/08 |
| 2022/0371732 A1* | 11/2022 | Zhao | ..................... | G05D 1/104 |
| 2022/0376772 A1* | 11/2022 | Zhao | .................... | H04W 24/08 |
| 2022/0377115 A1* | 11/2022 | Zhao | ..................... | H04L 65/403 |
| 2022/0377503 A1* | 11/2022 | Zhao | ..................... | H04W 76/19 |
| 2023/0007528 A1* | 1/2023 | Cheng | .................. | H04W 28/02 |
| 2023/0025701 A1* | 1/2023 | Zhao | ..................... | H04L 65/61 |

* cited by examiner

LOCATION REPORTING FOR SERVICE ENABLER ARCHITECTURE LAYER (SEAL)

INCORPORATION BY REFERENCE

This present disclosure claims priority to U.S. Provisional Application No. 63/172,050, "A Method of Supporting Location Timestamp Reporting for 3GPP SEAL Architecture" filed on Apr. 7, 2021, which is incorporated by reference herein in its entirety.

TECHNICAL FIELD

The present disclosure describes embodiments generally related to a service enabler layer for supporting vertical applications operating over a wireless network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless communication systems are being designed with advanced built-in features to support enterprise segments or vertical industries such as health care, automotive, smart factories, mission-critical communications, and the like. Vertical application standards are being developed to enable rapid deployment of vertical services based on common services provided by wireless networks. A vertical domain can be an industry or a group of enterprises in which similar products or services are produced. A vertical application can provide services or functions useful in a specific vertical domain.

SUMMARY

Aspects of the disclosure provide a method of a service enabler architecture layer (SEAL). The method can include receiving a location reporting configuration at a first user equipment (UE) from a location management server of the SEAL. The location reporting configuration can indicate at least one location reporting event for triggering a first location information report from a first location management client at the first UE to the location management server. The first location information report can be transmitted to the location management server from the first location management client at the first UE in response to the at least one location reporting event occurring. The first location information report can include an identity of the first UE, an identity of the at least one location reporting event that triggers the first location information report, first location information of the first UE, and a first timestamp corresponding to the first location information of the first UE.

In an embodiment, a format of the first timestamp corresponding to the first location information of the first UE is one of:
yyyy-month-dayTHH:MM:SS,
Monday, DD Mon YYYY HH:MM:SS TimeZone, and
yyyy-mn-ddTHH:MM:SS.

An embodiment of the method can further include receiving a location information request from the location management server of the SEAL, and, in response to the received location information request, transmitting a second location information report to the location management server. The second location information report can include second location information of the first UE and a second timestamp corresponding to the second location information of the first UE.

An embodiment of the method can further include transmitting a location reporting trigger to the location management server to activate a location reporting process for obtaining third location information of a second location management client of the SEAL at a second UE. A third location information report can be received from the location management server, the third location information report including the third location information of the second UE and a third timestamp corresponding to the third location information of the second UE.

In an embodiment, a type of the first location information identified in the location reporting configuration is one of an E-UTRA cell global identifier (ECGI), a multimedia broadcast multicast services service area identity (MBMS SAI), and geographic coordinates.

An embodiment of the method can further include transmitting a location information subscription request including a location information subscription configuration to the location management server. A location information notification can be received from the location management server. The location information notification can include an identity of a third UE, an identity of the first UE, an identity of an event that triggered the location information notification, latest location information of the third UE, and a fourth timestamp associated with the latest location information of the third UE.

Aspects of the disclosure can provide another method of a SEAL. The method can include transmitting from a location management server a location reporting configuration to a first location management client of the SEAL at a first UE. The location reporting configuration can indicate at least one location reporting event for triggering a first location information report from the first location management client of the SEAL at the first UE to the location management server. The first location information report can be received from the first location management client of the SEAL at the first UE. The first location information report can include an identity of the first UE, an identity of the at least one location reporting event that triggers the first location information report, first location information of the first UE, and a first timestamp corresponding to the first location information of the first UE. The first location information of the first UE can be stored in a memory.

Aspects of the disclosure can provide a non-transitory computer-readable medium storing instructions. The instructions, when executed by a processor, can cause the processor to perform the above methods.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Service Enabler Layer for Verticals

1. Service Enabler Architecture Layer (SEAL)

Embodiments of the disclosure implement a service enabler layer for supporting vertical applications (or verticals). The service enabler layer can be referred to as a service enabler architecture layer (SEAL) in this disclosure. The SEAL can provide a common set of capabilities (or services) used by multiple verticals to accelerate the development and deployment of vertical applications. For example, instead of developing auxiliary services specific to each vertical, commonly needed auxiliary services can be captured into the SEAL and shared by multiple vertical applications. Usage of all SEAL services by a vertical application can be optional. A vertical application can decide to use any subset of services from the SEAL.

2. Generic Functional Model for SEAL Services

In some embodiments, a functional model for SEAL can be organized into a generic SEAL service functional model and multiple specific SEAL service functional models. The generic SEAL service functional model can be used as a reference model for the specific SEAL service functional models. The generic functional model can include an on-network functional model and an off-network functional model. In various embodiments, the SEAL services provided to support the vertical application layer can include location management, group management, configuration management, identity management, key management, network resource management, and the like.

Figure 1:
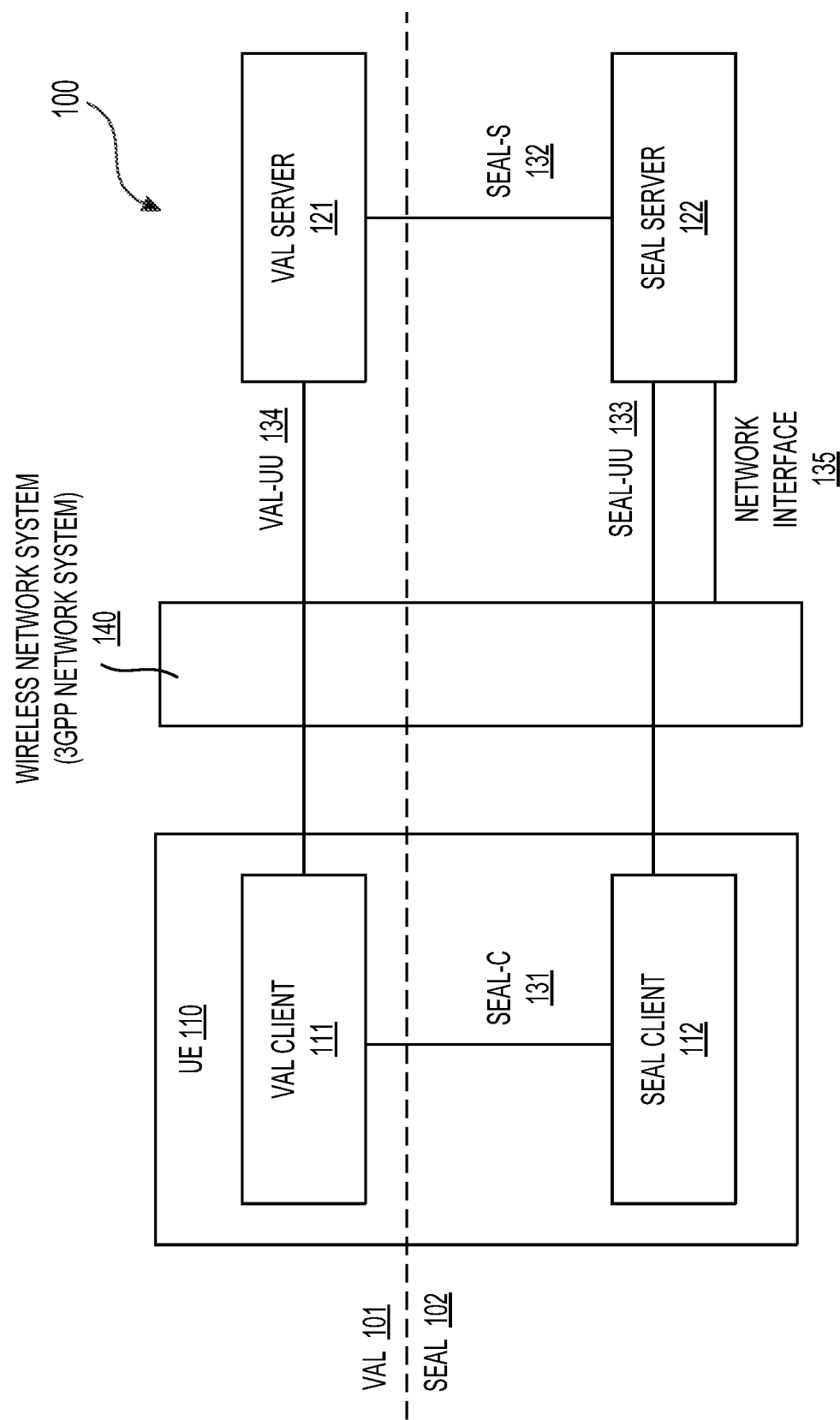
FIG. 1 shows a generic on-network functional model (100) according to an embodiment of the disclosure.

FIG. 1 shows a generic on-network functional model (100) according to an embodiment of the disclosure. The model (100) can include four types of functional entities: a vertical application layer (VAL) client (111), a VAL server (121), a SEAL client (112), and a SEAL server (122). The number of each type of functional entities in the model (100) can be one or more than one. The VAL client and the VAL server entities can belong to a VAL (101). The SEAL client and the SEAL server entities can belong to a SEAL (102). The VAL client (111) and the SEAL client (112) can be included in a user equipment (UE) (110). The model (100) further includes a wireless network system (140) (such as a Third Generation Partnership Project (3GPP) network system). The elements can be coupled together as shown in FIG. 1.

In the VAL (101), the VAL client (111) communicates with the VAL server (121) over a VAL-UU reference point (134) corresponding to a VAL-UU interface. In an example, the VAL-UU interface supports both unicast and multicast delivery modes.

The SEAL (102) offers various services to the VAL (101). The SEAL client(s) communicates with the SEAL server(s) over a SEAL-UU reference point(s) (133) corresponding to a SEAL-UU interface. The SEAL-UU interface supports both unicast and multicast delivery modes. The SEAL client(s) provides the service enabler layer support functions to the VAL client(s) over a SEAL-C reference point (131) (corresponding to a SEAL-C interface). The VAL server(s) communicates with the SEAL server(s) over a SEAL-S reference point(s) (corresponding to a SEAL-S interface). The SEAL server(s) (122) may communicate with the underlying 3GPP network system (140) using a respective 3GPP interface (135) specified by the 3GPP network system.

For a specific service (such as the location management service), a specific SEAL client and a specific SEAL server along with their specific SEAL-UU reference point and the specific network interface of the 3GPP network system can form or belong to a specific on-network functional model.

In some embodiments, to support distributed SEAL server deployments, a SEAL server may interact with another SEAL server for the same SEAL service over a so-called SEAL-E reference point (not shown in FIG. 1). A SEAL server can interact with another SEAL server for inter-service communication over a so-called SEAL-X reference point (not shown in FIG. 1). A SEAL server may interact with a VAL user database for storing and retrieving a user profile over a VAL-UDB reference point.

In various embodiments, functional entities in a VAL system (for example, including the VAL 101 and the SEAL 102) can provide application control and media-specific functions to support one or more VAL services. In the FIG. 1 example, the VAL client (111) (e.g., a vehicle-to-everything (V2X) client) can provide client-side functionalities corresponding to a vertical application (e.g., a V2X application). The VAL client (111) can support the vertical application's interactions with the SEAL client(s) (112). The VAL server (121) (e.g. a V2X application server) can provide server-side functionalities corresponding to the vertical application.

In the FIG. 1 example, the SEAL client (112) can provide client-side functionalities corresponding to a specific SEAL service (e.g., location management, network resource management, or the like). The SEAL client (112) can support interactions with the VAL client(s) (111). The SEAL client can also support interactions with a corresponding SEAL client between the two UEs. The SEAL server (122) can provide server-side functionalities corresponding to the specific SEAL service. The SEAL server (122) can support interactions with the VAL server(s) (121). The SEAL server can also support interactions with the corresponding SEAL server in distributed SEAL deployments.

It is noted that the functional entities in the model (100) can be implemented in various ways in different embodiments. For example, the functional entities can be implemented in a distributed manner or a centralized manner. The functional entities can be implemented as software or a combination of software and hardware.

In the FIG. 1 example, the VAL user database (not shown) can contain information of user profiles associated with a VAL service provided by a VAL service provider. Typically, each VAL service may have a corresponding user database, such as a mission critical push to talk (MCPTT) user database, a mission critical video (MCVideo) user database, and a mission critical data (MCData) user database.

In some embodiments, the interactions related to the VAL (101) support functions between the VAL client (111) and the VAL server (121) are supported by the VAL-UU reference point (134). In an example, this reference point (134) is an instance of a Uu reference point as described in 3GPP TS 23.401 and 3GPP TS 23.501. In some embodiments, the interactions related to VAL support functions between the VAL clients of two UEs can be supported by a VAL-PC5 reference point (not shown). For example, this reference point can be an instance of a PC5 reference point as described in 3GPP TS 23.303.

In some embodiments, the interactions between a SEAL client (112) and the corresponding SEAL server (122) are supported by a SEAL-UU reference point (133). The specific SEAL service reference point corresponding to the SEAL-UU (133) can be specified in a specific SEAL service functional model. In some embodiments, the interactions between the SEAL clients of two VAL UEs can be supported by a SEAL-PC5 reference point (not shown). The specific SEAL service reference point corresponding to the SEAL-PC5 can be specified in a specific SEAL service functional model.

In some embodiments, the interactions between the VAL client(s) (111) and the SEAL client(s) (112) within the VAL UE (110) are supported by a SEAL-C reference point (131). The specific SEAL service reference point corresponding to the SEAL-C (131) can be specified in a specific SEAL service functional model.

In some embodiments, the interactions between the VAL server (121) and the SEAL server (132) are supported by a SEAL-S reference point (132). A specific SEAL service reference point corresponding to the SEAL-S (132) can be specified in the specific SEAL service functional model.

In some embodiments, the interactions between the SEAL servers of the same type (e.g., providing a same type of SEAL service) are supported by a SEAL-E reference point (not shown). The specific SEAL service reference point corresponding to the SEAL-E is specified in the specific SEAL service functional model.

In some embodiments, the interactions between the SEAL servers of different types can be supported by a SEAL-X reference point. Examples of specific reference points corresponding to the SEAL-X reference points can include a reference point SEAL-X1 between a key management server and a group management server, a reference point SEAL-X2 between a group management server and a location management server.

A reference point VAL-UDB exists between a VAL user database and a SEAL server. The reference point VAL-USB can be used for storing the user profile data in a specific VAL user database and obtaining the user profile from the specific VAL user database for further configuration in a UE.

3. Identities

In various embodiments, different identities can be configured and used in a VAL system developed based on the model (100). In some embodiments, a VAL user can present a user identity (User ID) to an identity management server in the SEAL (102) during a user authentication transaction to provide an identity management client a means for VAL service authentication. In general, since identity management is a common SEAL service, the identity management server uses a set of credentials (e.g. biometrics, secureID, username/password) that may not necessarily be tied to a single VAL service. The user credentials uniquely identify the VAL user to the identity management server. As an example, the specific security and authentication mechanisms required in order to use the user ID is specified in 3GPP TS 33.434.

In some embodiments, a VAL user ID is a unique identifier within the VAL service that represents the VAL user. For example, the VAL user ID may be a URI. The VAL user ID is used for authentication and authorization purposes for providing the VAL service towards the VAL user via a VAL UE. The VAL user ID also indicates a VAL service provider with which the VAL user has a VAL service agreement. The VAL user may have a VAL service agreement with a VAL service provider and thus have obtained a unique VAL user ID per a VAL service provider. The VAL user ID can be used to access a SEAL service.

In some embodiments, a VAL UE ID is a unique identifier within a VAL service that represents the VAL UE. For example, the VAL UE ID for a V2X service is mapped to a Station ID as specified in ETSI TS 102 894-2. The VAL UE ID is used to address the VAL UE in order to send VAL messages.

In some embodiments, a VAL service ID is a unique identifier that represents a VAL service. A VAL server provides a list of VAL services towards VAL users or VAL UEs. Each VAL service is uniquely identified by a VAL service ID, which is an identifier of the VAL application providing that VAL service. The VAL service ID can be used for policy mapping, QoS handling for VAL communication and VAL message distribution. For example, an identifier of a V2X service, e.g. ITS-AID or PSID specified in ETSI TS 102 965 and ISO TS 17419, can be used as a V2X service ID.

In some embodiments, a VAL group ID is a unique identifier within a VAL service that represents a set of VAL users or VAL UEs according to the VAL service. The set of VAL users may belong to the same or different VAL service providers. The VAL group ID indicates the VAL application server where the group is defined.

In some embodiments, a VAL system ID is a globally unique identifier representing a VAL system. In some embodiments, a VAL Stream ID is an identity used by the VAL server to identify a VAL stream.

4. Application of Functional Model to Deployments

In various embodiments, the SEAL architecture as described above can support deployments in which SEAL services are deployed within and/or outside a public land mobile network (PLMN) network. The SEAL architecture can also support centralized as well as distributed deployments of vertical applications. A mobile network operator (MNO) can leverage an appropriate deployment model according to need and that is suitable to its business.

A deployment model can involve multiple entities, such as VAL users, VAL service providers, SEAL providers, and PLMN operators. As an example, in a possible deployment model, SEAL server(s) can be deployed within a PLMN operator domain, and vertical application servers can be deployed in a VAL service provider domain. SEAL servers can also interact with another SEAL server of a same SEAL service, which is deployed in a different PLMN operator domain, using a SEAL-E interface.

There can be possibilities of multiple business relationships among entities involved in a deployment. Based on a service-specific agreement, VAL Users belong to a VAL service provider domain. A VAL service provider and a home PLMN operator may belong to a same organization. The VAL service provider can have a service agreement with a SEAL service provider. It is also possible that the VAL service provider, the SEAL service provider, and the home PLMN operator belong to the same organization. The VAL service provider and the home PLMN operator may have a service agreement if they do not belong to the same organization.

5. V2X Vertical Application Based on SEAL

In an embodiment, a V2X vertical application is developed based on SEAL services. The SEAL can support multiple SEAL services. Each SEAL service can support multiple processes. Typically, a SEAL client will not initiate a process itself. In order for the SEAL client to start a process, the V2X vertical application needs to provide triggers and parameters related to the process to the SEAL client.

For example, a V2X application-level functional model is defined in 3GPP TS 23.286. As defined, a V2X application enabler (VAE) layer provides VAE capabilities for a V2X application specific layer. The VAE layer utilizes SEAL services. A VAE client can act as a VAL client for interactions with a SEAL client as specified by the SEAL architecture. A VAE server can act as a VAL server for interactions with a SEAL server as specified by the SEAL architecture.

The V2X application layer can provide a group joining strategy and a group leader for each group. The VAE client and the VAE server use a SEAL group management service for group management operations. The V2X application layer is responsible for deciding when to create, modify or delete groups. Before a V2X UE starts to receive a V2X service from the V2X application layer, the VAE client and the VAE server can use the SEAL configuration management service to provide configurations to the V2X UE. When the V2X UE has received the V2X service from the V2X application layer, the VAE client and the VAE server can also use the SEAL configuration management service to provide configuration updates to the V2X UE.

The VAE client and VAE server can use a SEAL location management service to manage the location information of a V2X UE and update location information to the V2X application layer. The VAE client and the VAE server can use a SEAL identity management service to authenticate and authorize the V2X UE for using a V2X application server. The VAE client and the VAE server can use a SEAL network resource management service to establish, modify and switch between different types of bearers.

The VAE server can also use a SEAL API to use SEAL services to enable different functions or services of the V2X application. For example, to create a group for a V2X application, the VAE server can invoke a create service operation of the group management API on a GM-S reference point. A group management server can create a group document and notify the VAE server of the newly created group information.

In various embodiments, multiple vertical applications can use SEAL services at the same time. For example, two vertical applications V2X and MCPTT can use SEAL services. A SEAL server can interface with both vertical application servers. In addition, each vertically specific UE can include a SEAL client that provides services to vertical application clients. The two SEAL clients interact with the SEAL server to provide support to the two vertical applications.

II. Location Management Service

1. Functional Model for Location Management

In various embodiments, location management of a SEAL service offers location management related capabilities to one or more vertical applications. The location management can be implemented based on a location management functional model. The location management functional model can be based on the generic functional model described above. The location management functional model can include an on-network functional model and an off-network functional model.

Figure 2:
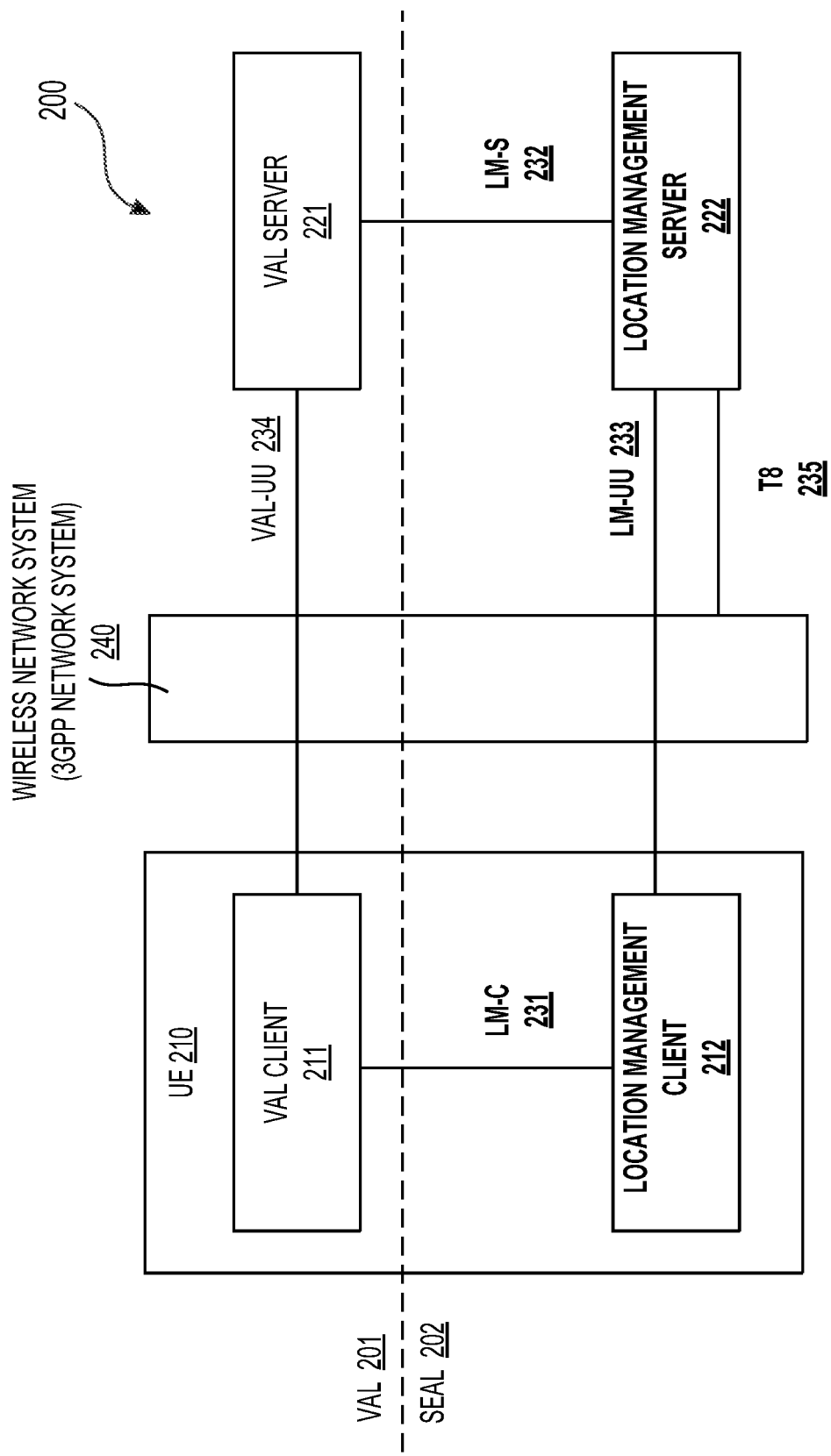
FIG. 2 shows an exemplary on-network location management functional model (200) according to some embodiments of the disclosure.

FIG. 2 shows an exemplary on-network location management functional model (200) according to some embodiments. The model (200) can include a VAL client (211), a VAL server (221), a location management client (212), and a location management server (222). The functional entities can be coupled together as shown in FIG. 2.

The VAL client (211) and the VAL server (221) belong to a VAL (201). The location management client (212) and the location management server (222) belong to a SEAL (202). The VAL client (211) and the location management client (212) can be included in a UE (210). The model (200) can also include a wireless work system (240) (such as a 3GPP network system) that provides communication paths for the UE (210) to communicate with the VAL server (221) and the location management server (222). It is noted that there can be multiple VAL clients in place of the VAL client (211) in the model (200) that use the location management SEAL service provided by the location management client (212) and the location management server (222). Also, there can be multiple VAL servers in place of the VAL server (221) in the model (200) that use the location management SEAL service provided by the location management client (212) and the location management server (222).

In some embodiments, the location management client (212) communicates with the location management server (222) over an LM-UU reference point (233). The location management client (222) provides the support for location management functions to the VAL client (211) over an LM-C reference point (231). The VAL server (221) communicates with the location management server (222) over an LM-S reference point (232). The VAL client (211) communicates with the VAL server (221) over a VAL-UU reference point (234).

In some embodiments, the location management server (222) communicates with the underlying wireless communication system (240) to obtain location information via an interface (235) (e.g., T8 interface). In an example, the location management server (222) communicates with a service capability exposure function (SCEF) via a T8 interface (235) to obtain location information from the underlying 3GPP network system. In an example, the location management server (222) can obtain location information from a location server (LCS) of a 4G system using another interface. In an example, the location management server (222) can obtain location information via an Le interface from the 3GPP network system (240).

In an off-network location management functional model, VAL clients in a VAL distributed in different UEs can communicate with each other over a VAL-PC5 reference point. Location management clients in a SEAL distributed in different UEs can communicate with each other over an LM-PC5 reference point.

In some embodiments, the location management client (212) interacts with the VAL client (211) to perform location management functions. The location management client (212) also interacts with the location management server (222). The location management client (212) also supports interactions with a corresponding location management client between the two UEs.

In some embodiments, the location management server (222) receives and stores user location information and provides user location information to the VAL server (221). The location management server (222) may also acquire location information provided by a PLMN operator of the 3GPP network system (240) via, for example, the T8 interface (235). The location management server (222) also supports interactions with a corresponding location management server in distributed SEAL deployments.

The VAL client (211) and the VAL server (221) can function in a similar way as the VAL client (111) and the VAL server (121), respectively, in the FIG. 1 example.

In some embodiments, the interactions related to location management functions between the location management client (212) and the location management server (222) are supported by the LM-UU reference point (233). In an example, this reference point (233) utilizes a Uu reference point as described in 3GPP TS 23.401 and 3GPP TS 23.501. The LM-UU reference point (233) provides a means for the location management server (222) to receive a location information report from the location management client (212).

In some embodiments, the interactions related to location management functions between the location management clients located in different VAL UEs are supported by an LM-PC5 reference point. In an example, this reference point utilizes a PC5 reference point as described in 3GPP TS 23.303. In some embodiments, the interactions related to location management functions between the VAL client(s) (211) and the location management client (212) within the VAL UE (210) are supported by the LM-C reference point (231).

In some embodiments, the interactions related to location management functions between the VAL server(s) (221) and the location management server (222) are supported by the LM-S reference point (232). In an example, this reference point (232) is an instance of CAPIF-2 reference point as specified in 3GPP TS 23.222. For example, the LM-S reference point (232) is used by the VAL server (221) to request and receive location information from the location management server (222).

In some embodiments, the interactions related to location management functions between the location management servers in a distributed deployment are supported by an LM-E reference point. In some embodiments, the T8 interface (235) supports the interactions between the location management server (222) and an SCEF that is specified in 3GPP TS 23.682. The functions related to location management of T8 are supported by the location management server (222).

Figure 3:
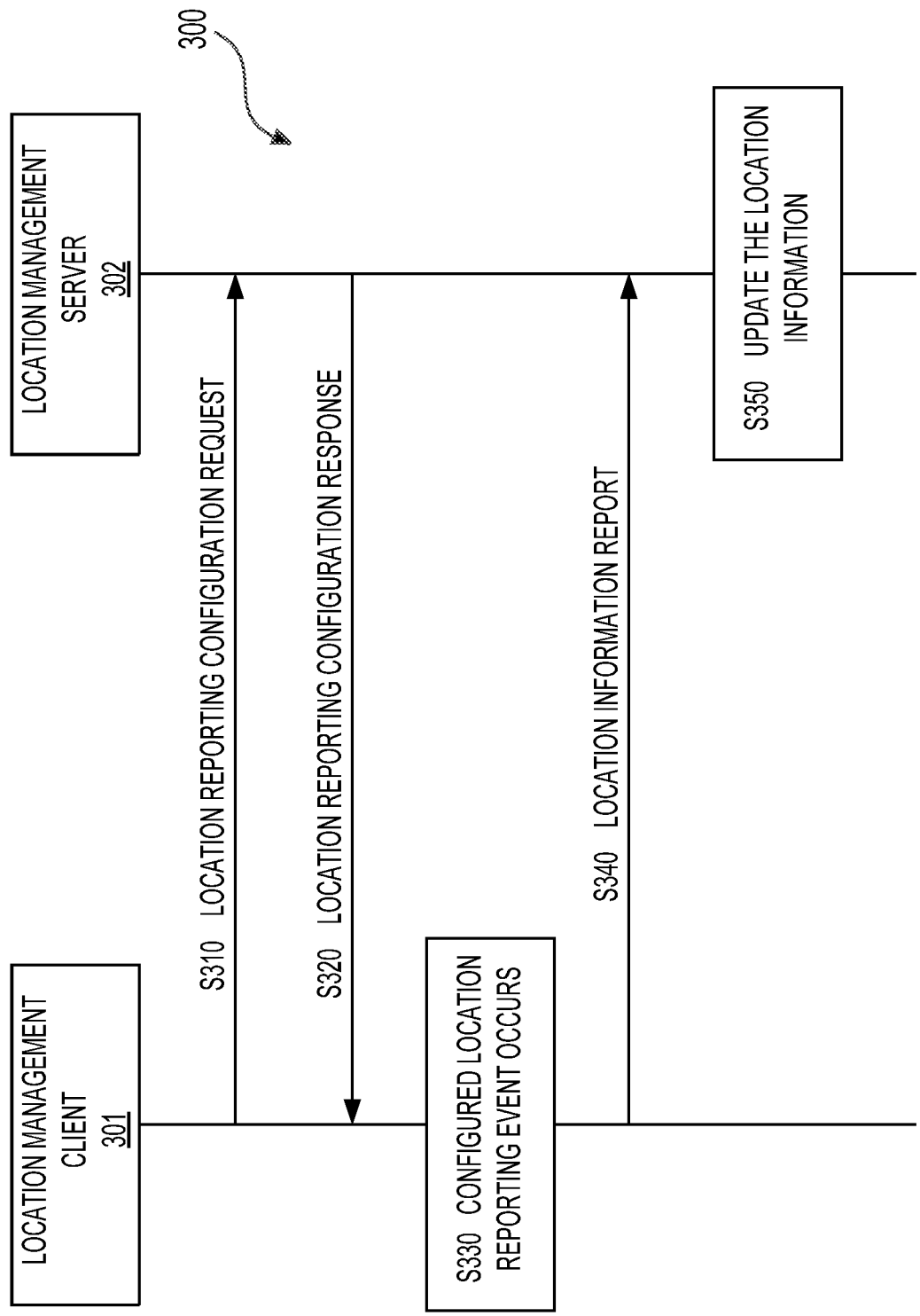
FIG. 3 shows an event-triggered location reporting process (300) according to some embodiments of the disclosure.

2. Examples of Location Management Processes 2.1 Event-Triggered Location Reporting Process FIG. 3 shows an event-triggered location reporting process (300) according to some embodiments of the disclosure. The process (300) can be performed by a location management client (301) and a location management server (302). The process (300) can start at (S310).

At (S310), the location management client (301) can transmit a location reporting configuration request message to the location management server (302) to fetch a location reporting configuration.

At (S320), the location management server (302) can transmit a location reporting configuration response message to the location management client (301) in response to receiving the location reporting configuration request message. The location reporting configuration response message can include the location reporting configuration. The location reporting configuration can be an initial configuration or an update to a prior configuration. The location reporting configuration can indicate what types of location information the location management server (302) expects and what events will trigger the sending of location information to the location management server (302).

In some embodiments, the decision to report location information can be triggered at the location management client (301) by various conditions or events, e.g., reception of a location reporting configuration, an initial registration to a wireless network, a distance travelled, an elapsed time, a cell change, an MBMS SAI change, an MBMS session change, leaving a specific MBMS bearer service area, a tracking area change, a PLMN change, a call initiation, an emergency, or other types of events. In an embodiment, the location reporting configuration can further indicate a minimum time between consecutive reports. In an embodiment, the location reporting configuration can further indicate whether a timestamp of the location information report is needed.

In some embodiments, the location reporting configuration response message can be sent over a unicast bearer to a specific location management client (e.g., the location management client (301)) or as a group message over an MBMS bearer to update the location reporting configuration for multiple location management clients at the same time. In an example, if the multicast delivery mode is used, the MBMS bearer being used is activated by the location management server.

In some embodiments, the location management client (301) stores or updates the location reporting event triggers configuration in response to receiving the location reporting configuration. In an example, the location reporting configuration information can be made part of the user profile. In such a scenario, the sending of the location information configuration response message is not necessary. In some embodiments, different location management clients may be given different location reporting criteria.

At (S330), the location management client (301) can detect that a configured location reporting event occurs. Accordingly, a location information report can be triggered.

At (S340), the location management client (301) can transmit the location information report to the location management server (302). The location information report can include location information identified by the location management server (302) and available to the location management client (301).

In an embodiment, the location information report can include one or more of the following information elements: (1) An identity of a VAL user or VAL UE corresponding to the location management client (301). For example, the VAL UE contains the location management client (301). The VAL user uses the service of the location management client (301) via a VAL client above the location management client (301). (2) An identity of the event that triggered the transmission of the location information report. (3) Location information of the VAL UE when the event that triggered the transmission of the location information report takes place. (4) Optionally, a timestamp of the location information report. For example, the timestamp can indicate a time when the event that triggered the transmission of the location information report takes place. Or, the timestamp can indicate a time corresponding to a location of the VAL UE indicated by the location information report. In an example, when the location report configuration indicates inclusion of the timestamp of the location information report, the timestamp would be included in the location information report.

In an example, the location information report from the location management client (301) to the location management server (302) can include all or part of the information shown in Table 1.

TABLE 1

| Information element | Status | Description |
| --- | --- | --- |
| Set of identities | M | Set of identities of the reporting VAL users or VAL UEs |
| Triggering event | M | Identity of the event that triggered the sending of the report |
| Location Information | M | Location information |
| Timestamp | O | Timestamp of the location report |

In Table 1, "M" denotes "mandatory", and "O" denotes "optional".

In some embodiments, the timestamp in the location information report can take one of several different time formats, such as ISO 8610 (e.g., yyyy-month-dayTHH:MM:SS), RFC 1123 (e.g., Monday, DD Mon YYYY HH:MM:SS TimeZone), coordinated universal time (UTC: yyyy-mn-ddTHH:MM:SS), and the like.

In some embodiments, the location information report can include at least one of several different types of location information, such as E-UTRA cell global identifier (ECGI), multimedia broadcast multicast services service area identity (MBMS SAI), and geographic coordinates, and other types of location information.

At (S350), upon receiving the location information report, the location management server (302) can store information included in the location information report in a local memory. For example, the location management server (302) can update a location of the reporting location management client (301). If the location management server (302) does not have location information of the reporting location management client (301) before, then the location management server (302) can just store the reported location information for that location management client (301).

2.2 On-Demand Location Reporting Process

Figure 4:
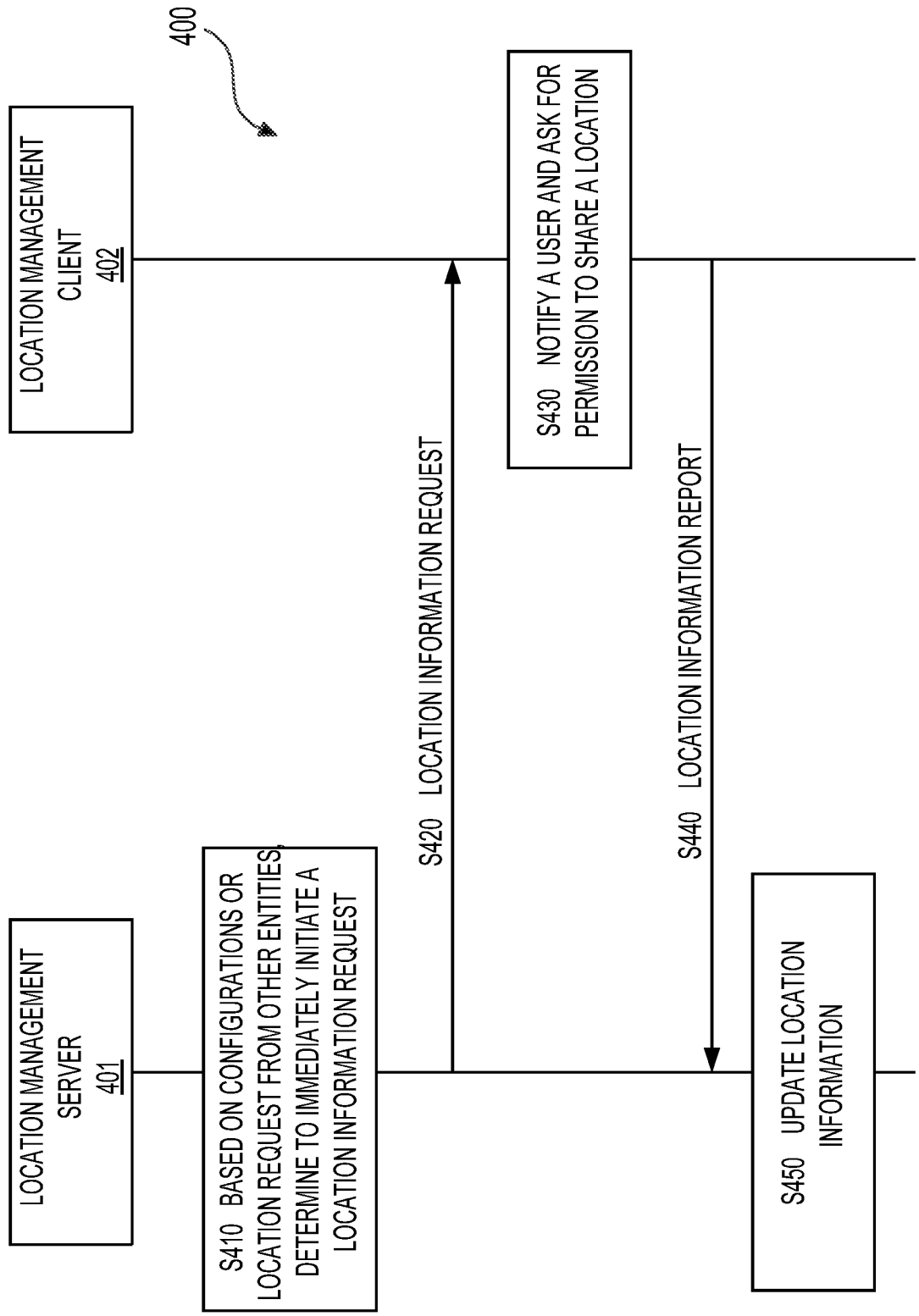
FIG. 4 shows an on-demand location reporting process (400) according to some embodiments of the disclosure.

FIG. 4 shows an on-demand location reporting process (400) according to some embodiments of the disclosure. The process (400) can be performed by a location management server (401) and a location management client (402). During the process (400), in some embodiments, the location management server (401) can request UE location information at any time by sending a location information request to the location management client (402), which may trigger the location management client (403) to immediately send a location report.

At (S410), based on configurations such as a periodic location information report timer, or a location information request from other entities (e.g., another location management client or VAL server), the location management server (401) can determine to immediately initiate a location information request.

At (S420), the location management server (401) sends the location information request to the location management client (402). For example, the location information request may include an identity of a VAL user or a VAL UE and specify what type of location information is requested for the VAL user or the VAL UE.

At (S430), optionally, at the location management client (402), the VAL user or VAL UE can be notified and asked about permission to share its location. The VAL user can accept or deny the request. In some embodiments, the location can be shared automatically without further user input.

At (S440), the location management client (402) responds to the location management server (401) with a location information report containing location information identified by the location management server (401) and available to the location management client (402). In some embodiments, the location information report of (S440) can be similar to the location information report of (S340). For example, the location information report of (S440) can include location information of the location management client (402) and a timestamp associated with a location indicated by the location information. The location information report of (S440) may or may not indicate a trigger event for the location information report.

At (S450), upon receiving the location information report, the location management server (401) can update the location of the reporting location management client (402). In an example, if the location management server (401) does not have location information of the reporting location management client (402) before, the location management server (401) can just store the reporting location information of the location management client (402).

2.3 Client-Triggered or VAL Server-Triggered Location Reporting Process

Figure 5:
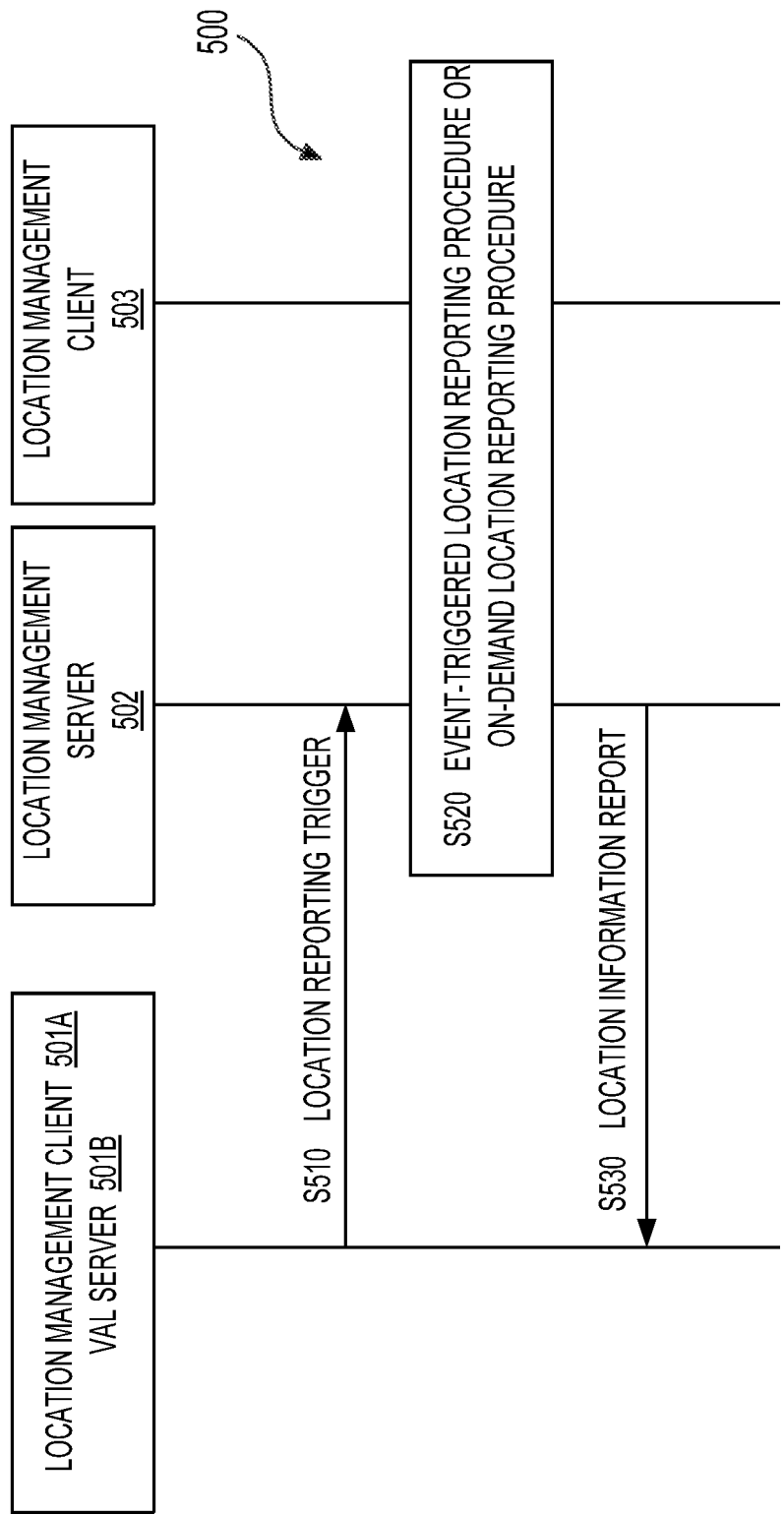
FIG. 5 shows a client-triggered or VAL server-triggered location reporting process (500) according to some embodiments of the disclosure.

FIG. 5 shows a client-triggered or VAL server-triggered location reporting process (500) according to some embodiments of the disclosure. The process (500) can be performed by a first location management client (501A) or a VAL server (501B), a location management server (502), and a second location management client (503). During the process (500), in some embodiments, the first location management client (501A) or the VAL server (501B) can initiate a request for location information of a VAL user or VAL UE corresponding to the second location management client (503). In response, the location management server (502) can obtain the requested location information and report to the first location management client (501A) or the VAL server (501B).

At (S510), the first location management client (501A) (e.g., corresponding to an authorized VAL user or VAL UE) or the VAL server (501B) sends a location reporting trigger to the location management server (502) to activate a location reporting procedure for obtaining the location information of the second location management client (503).

At (S520), the location management server (502) can check whether the first location management client (501A) or the VAL server (501B) is authorized to send a location reporting trigger. Subsequently, depending on the information specified by the location reporting trigger, the location management server (502) can initiate an on-demand location reporting procedure or an event-triggered location reporting procedure for requesting location information of the second location management client (503).

At (S530), once the location information of the second location management client (503) is available at the location management server (502), a location information report can be sent to the first location management client (501A) or the VAL server (502). In some embodiments, the location information report of (S530) can be similar to the location information report of (S340). For example, the location information report of (S530) can include location information of the location management client (503) and a timestamp associated with a location indicated by the location information. The location information report of (S530) may or may not indicate a trigger event for the location information report.

In an embodiment, before the first location management client (501A) can request location information from the location management server (502), the first location management client (501A) can perform a registration process to register with the location management server (502). For example, the first location management client (501A) can send a timestamp request to the location management server (502) to request a timestamp be added to location information reports from the location management server (502). After that, the location information response messages from the location management server (502) will each include a timestamp in response to a respective location query from the first location management client (501A).

In an embodiment, for a location information query of the VAL server (501B) to the location management server (502), there is no registration process between the VAL server (501B) and the location management server (502). The location management server (502) can optionally send a response with a timestamp to the VAL sever (501B).

2.4 Location Information Subscription and Notification Process

Figure 6:
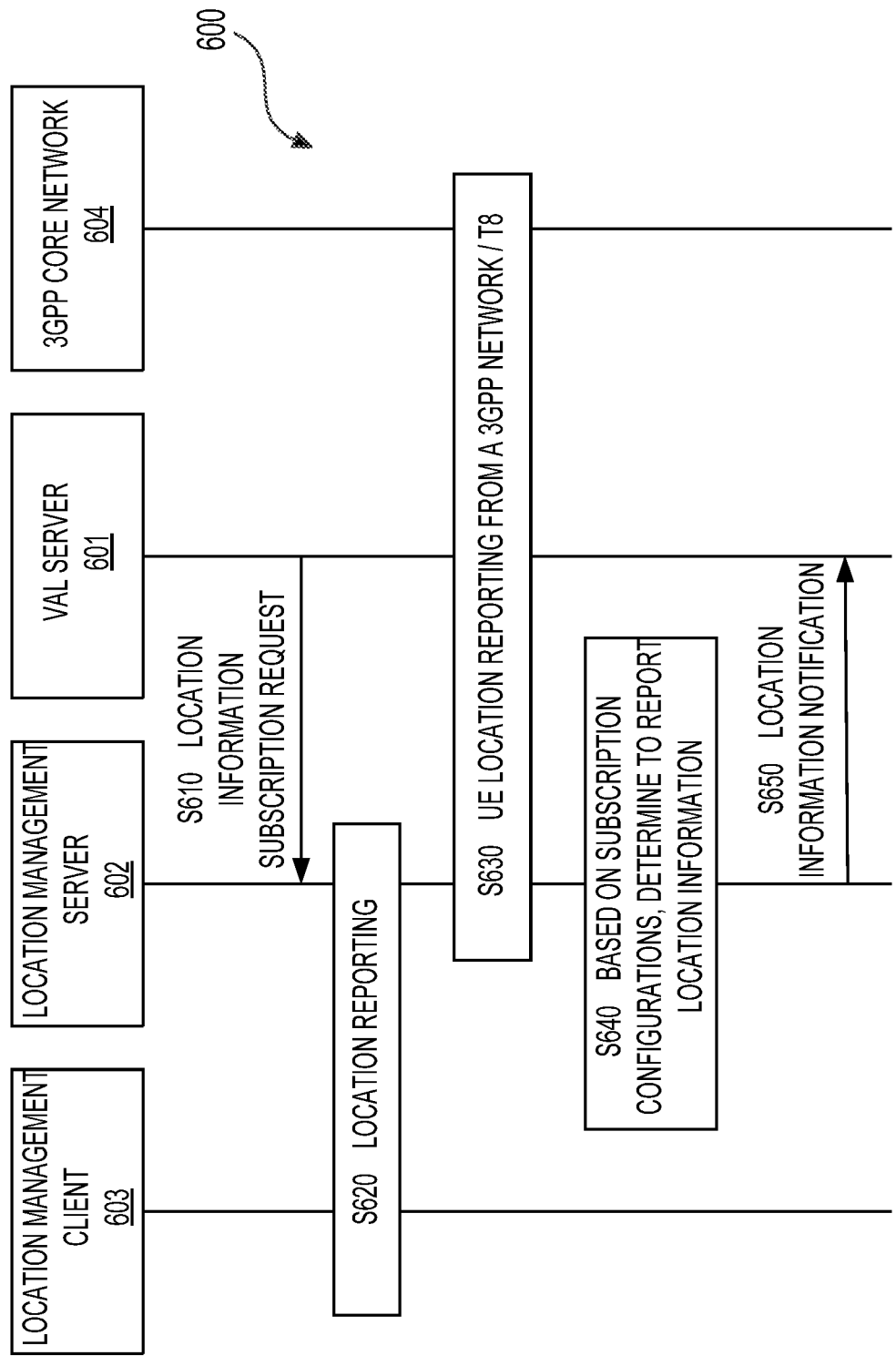
FIG. 6 shows a location information subscription and notification process (600) according to some embodiments of the disclosure.

FIG. 6 shows a location information subscription and notification process (600) according to some embodiments of the disclosure. The process (600) can be performed by a VAL server (601), a location management server (602), a location management client (603), and a 3GPP core network (604). During the process (600), the VAL server (601) can subscribe to location information of a VAL user or VAL UE corresponding to the location management client (603) to the location management server (602). The location management server (602) can provide a location information notification to the VAL server (601) based on a subscription configuration. The process (600) can be employed for tracking a UE, for example. In place of the VAL server (601), other entities, such as a location management client, can use the process (600) to subscribe for the location information corresponding to the location management client (603) and receive location information notifications accordingly from the location management server (602).

At (S610), the VAL server (601) can transmit a location information subscription request to the location management server (602) to subscribe to location information of one or more VAL users or VAL UEs. Each VAL user or VAL UE may correspond to a location management client. In the steps below, subscription and reporting of the location information of the VAL user or VAL UE corresponding to the location management client (603) are used as an example. The location information subscription request may indicate what type of location information is needed, a set of events for triggering a location report from the location management client (603), an interval for periodically providing a location information notification, and/or the like. The location information subscription request may indicate that location information from the 3GPP core network (604) (referred to as supplementary location information) is needed.

At (S620), the location management server (602) receives the latest location information of the VAL UE corresponding to the location management client (603) as per a location report procedure. For example, the location report procedure can be an event-triggered location reporting process (e.g., the process (300)) or an on-demand location reporting process (e.g., the process (400) triggered by a periodical location report timer configured based on the location information subscription request at S610). Before receiving the latest location information of the VAL UE, the location management server (602) may communicate with the location management client (603) to configure the location reporting. For example, as performed in the process (300), some events may be configured in the location management client (603) for triggering the location reporting.

At (S630), the location management server (602) may optionally receive the location information of the VAL UE from 3GPP core network (604). For example, if the indication for supplementary location information is included in the subscription request of S610, the UE location information can be obtained from the 3GPP core network (604).

At (S640), based on a location information subscription configuration provided by the location information subscription request at (S610) (e.g., a periodical location information report timer), the location management server (602) can determine to report the latest user location information of the location management client (603) to the VAL server (601). For example, the location management server (602) can determine the location information of the VAL UE as received in steps (S620) and/or (S630), including the supplementary location information (if indicated by the location information subscription request).

At (S650), the location management server (602) transmits a location information notification including the latest location information of one or more VAL users or VAL UEs to the VAL server (601) (or to the location management client that has previously performed a subscription to the location management server (602)).

In some embodiments, the location information notification can include one or more of the following information elements: (1) A list of the VAL users or VAL UEs, of which the location information is notified. (2) An identity of a VAL user or VAL UE that subscribes to the location corresponding to the location management client (603). (3) An identity of an event that triggered the transmission of the location information notification, or an identity of an event that triggered the location management client (603) to transmit the location information report at (S620). (4) Location information of the VAL users or VAL UEs, of which the location information is notified, that, for example, include the latest location information corresponding to the location management client (603). (5) A timestamp of the location report. In an example, a timestamp corresponding to a latest location indicated by the location information corresponding to the location management client (603) is included. In an example, a timestamp corresponds to a latest location of each of the VAL users or VAL UEs, of which the location information is notified, is included. In an example, a timestamp corresponding to the timing when the location information notification is generated is included.

In some embodiments, the location information notification from the location management server (602) to the VAL server (601) can include all or part of the information flow shown in Table 2.

TABLE 2

| Information element | Status | Description |
|---|---|---|
| Identities list | M | List of the VAL users or VAL UEs of which location information needs to be notified |
| Identity | M | Identity of the VAL user or VAL UE subscribed to location of another VAL user or VAL UE (NOTE) |
| Triggering event | M | Identity of the event that triggered the sending of the notification |
| Location Information | M | Location information |
| Timestamp | O | Timestamp of the location report |

NOTE:
This is used for location management server sends location information notification to the VAL user or VAL UE that has subscribed the location.

In some embodiments, the VAL server (601) may further share the location information in the location information notification to a group of or to another VAL user or VAL UE.

III. Exemplary Location Reporting Processes

Figure 7:
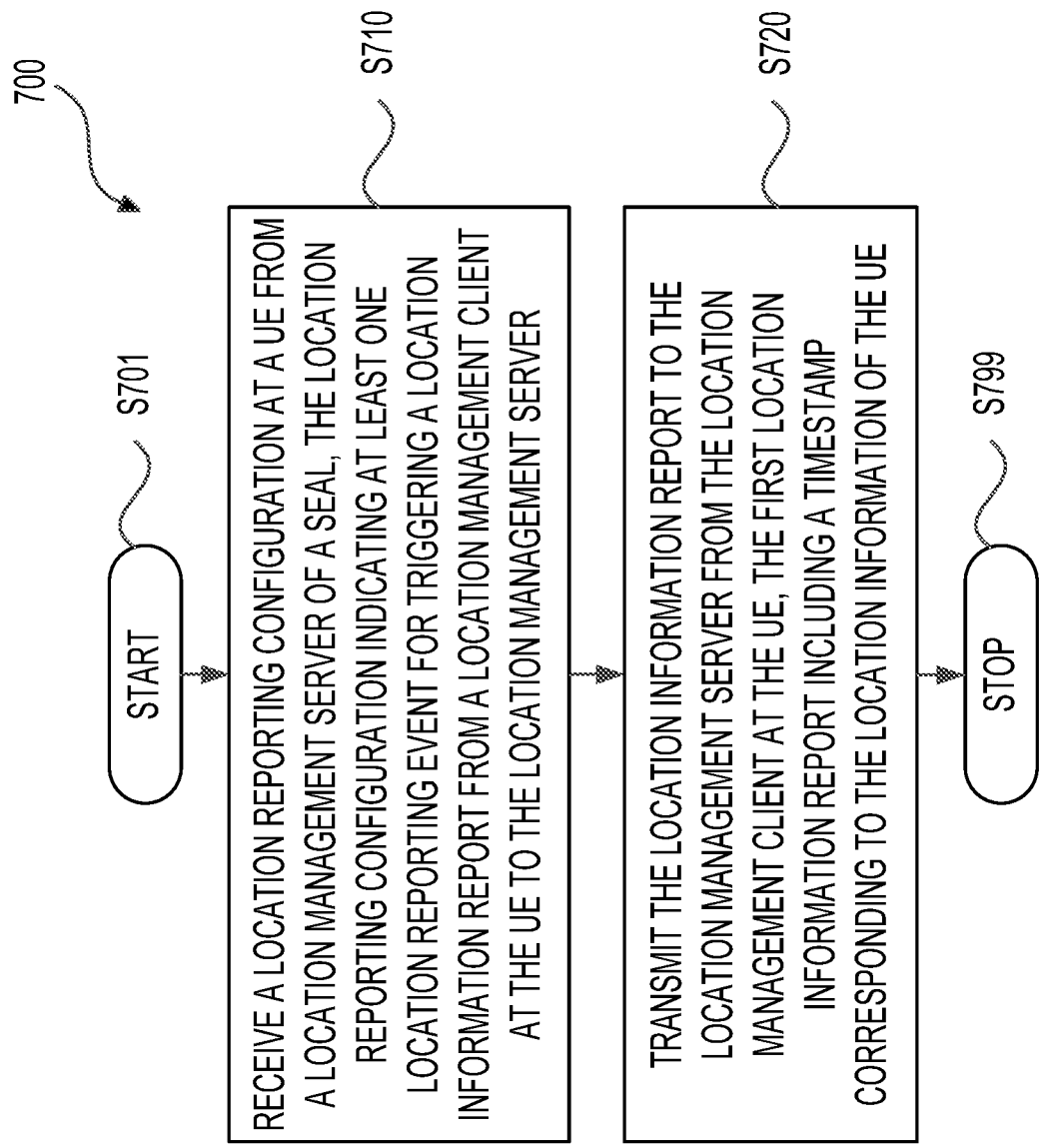
FIG. 7 shows a location reporting process (700) according to an embodiment of the disclosure.

FIG. 7 shows a location reporting process (700) according to an embodiment of the disclosure. The process (700) can be performed by a location management client of a SEAL. The process (700) can start from (S701) and proceed to (S710).

At (S710), a location reporting configuration can be received at a UE from a location management server of the SEAL. The location reporting configuration can indicate at least one location reporting event for triggering a location information report from the location management client at the UE to the location management server.

At (S720), the location information report can be transmitted to the location management server from the location management client at the UE in response to the at least one location reporting event occurring. In an example, the location information report can include an identity of the UE, an identity of the at least one location reporting event that triggers the location information report, location information of the UE, and a timestamp corresponding to the location information of the UE. In an example, a type of the location information is identified in the location reporting configuration.

In an example, a format of the timestamp corresponding to the location information of the UE is in accordance with one of ISO 8610, RFC 1123, and coordinated universal time (UTC). In an example, a type of the location information is one of an E-UTRA cell global identifier (ECGI), a multimedia broadcast multicast services service area identity (MBMS SAI), and geographic coordinates. The process (700) can proceed to (S799) and terminate at (S799).

Figure 8:
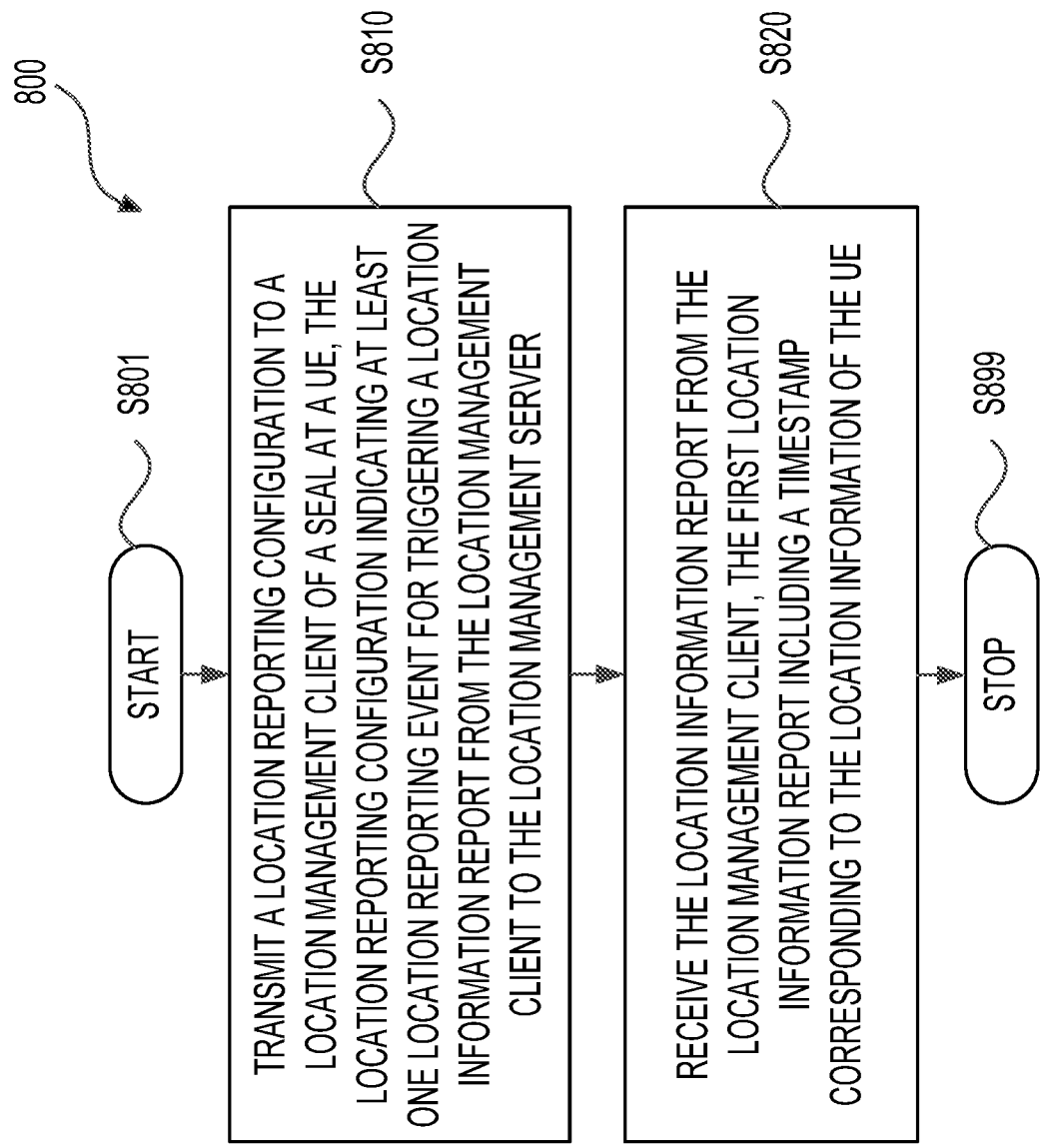
FIG. 8 shows a location reporting process (800) according to an embodiment of the disclosure.

FIG. 8 shows a location reporting process (800) according to an embodiment of the disclosure. The process (800) can be performed by a location management server of a SEAL. The process (800) can start from (S801) and proceed to (S810).

At (S810), a location reporting configuration can be transmitted to a location management client of the SEAL at a UE. The location reporting configuration can indicate at least one location reporting event for triggering a location information report from the location management client of the SEAL at the UE to the location management server.

At (S820), the first location information report can be received from the location management client of the SEAL at the UE. The first location information report can include an identity of the UE, an identity of the at least one location reporting event that triggers the location information report, location information of the UE, and a timestamp corresponding to the location information of the UE. In an example, a type of the location information is identified in the location reporting configuration.

In an example, a format of the timestamp corresponding to the location information of the UE is in accordance with one of ISO 8610, RFC 1123, and coordinated universal time (UTC). In an example, a type of the location information is one of an E-UTRA cell global identifier (ECGI), a multimedia broadcast multicast services service area identity (MBMS SAI), and geographic coordinates.

At (S830), the location information of the UE can be stored in a memory at the location management server. The process (800) can proceed to (S899) and terminate at (S899).

IV. Computer System

The techniques described above can be implemented as computer software using computer-readable instructions and physically stored in one or more computer-readable media. The computer software can be coded using any suitable machine code or computer language that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
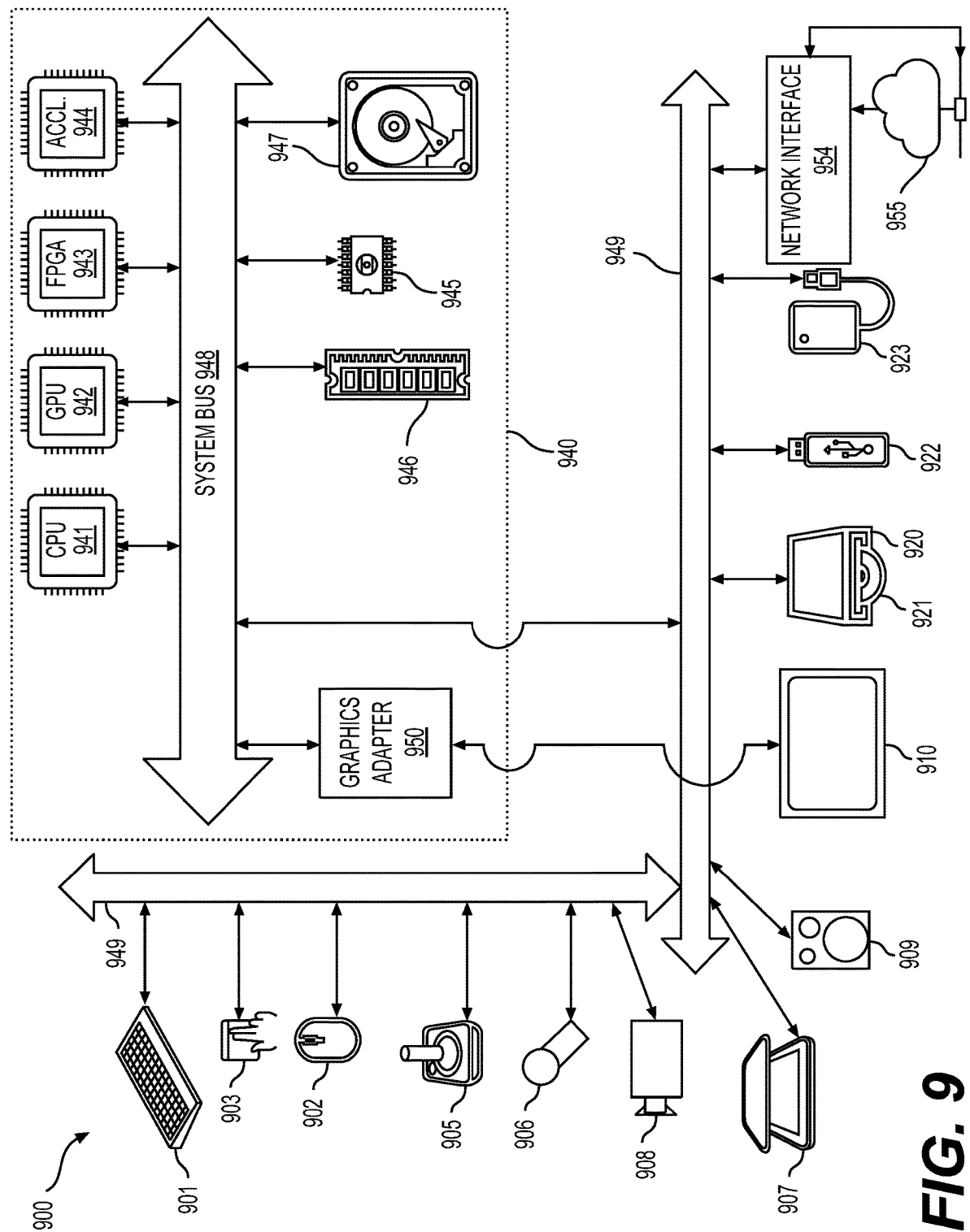
FIG. 9 is a schematic illustration of a computer system in accordance with an embodiment.

FIG. 9 shows a computer system (900) suitable for implementing certain embodiments of the disclosed subject matter. The components shown in FIG. 9 for the computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example, tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid-state drive (923), legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example, USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

The aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (~~50), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieval to any of the memory devices can be enabled through the use of cache memory, that can be closely associated with one or more CPU (941), GPU (942), mass storage (947), ROM (945), RAM (946), and the like.

The computer-readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of a service enabler architecture layer (SEAL), comprising:
receiving a location reporting configuration at a first user equipment (UE) from a location management server of the SEAL, the location reporting configuration indicating at least one location reporting event for triggering a first location information report from a first location management client at the first UE to the location management server; and
transmitting the first location information report to the location management server from the first location management client at the first UE in response to the at least one location reporting event occurring, the first location information report including:
an identity of the first UE,
an identity of the at least one location reporting event that triggers the first location information report,
first location information of the first UE, and
a first timestamp corresponding to the first location information of the first UE.

2. The method of claim 1, wherein a format of the first timestamp corresponding to the first location information of the first UE is one of:
yyyy-month-dayTHH:MM:SS,
Monday, DD Mon YYYY HH:MM:SS TimeZone, and
yyyy-mn-ddTHH:MM:SS.

3. The method of claim 1, further comprising:
receiving a location information request from the location management server of the SEAL; and
in response to the received location information request, transmitting a second location information report to the location management server, the second location information report including second location information of the first UE and a second timestamp corresponding to the second location information of the first UE.

4. The method of claim 1, further comprising:
transmitting a location reporting trigger to the location management server to activate a location reporting process for obtaining third location information of a second location management client of the SEAL at a second UE; and
receiving a third location information report from the location management server, the third location information report including the third location information of the second UE and a third timestamp corresponding to the third location information of the second UE.

5. The method of claim 1, wherein a type of the first location information identified in the location reporting configuration is one of:
an E-UTRA cell global identifier (ECGI),
a multimedia broadcast multicast services service area identity (MBMS SAI), and
geographic coordinates.

6. The method of claim 1, further comprising:
transmitting a location information subscription request including a location information subscription configuration to the location management server; and
receiving a location information notification from the location management server, the location information notification including:
an identity of a third UE,
an identity of the first UE,
an identity of an event that triggered the location information notification,
latest location information of the third UE, and
a fourth timestamp associated with the latest location information of the third UE.

7. A method of a service enabler architecture layer (SEAL), comprising:
transmitting from a location management server a location reporting configuration to a first location management client of the SEAL at a first user equipment (UE), the location reporting configuration indicating at least one location reporting event for triggering a first location information report from the first location management client of the SEAL at the first UE to the location management server;
receiving the first location information report from the first location management client of the SEAL at the first UE, the first location information report including:
an identity of the first UE,
an identity of the at least one location reporting event that triggers the first location information report,
first location information of the first UE, and
a first timestamp corresponding to the first location information of the first UE; and
storing the first location information of the first UE in a memory.

8. The method of claim 7, wherein a format of the first timestamp corresponding to the first location information of the first UE is one of:
yyyy-month-dayTHH:MM:SS,
Monday, DD Mon YYYY HH:MM:SS TimeZone, and
yyyy-mn-ddTHH:MM:SS.

9. The method of claim 7, further comprising:
transmitting a location information request to the first location management client of the SEAL at the first UE;
receiving a second location information report from the first location management client of the SEAL at the first UE, the second location information report including second location information of the first UE and a second timestamp corresponding to the second location information of the first UE; and
storing the second location information of the first UE at the memory.

10. The method of claim 7, further comprising:
receiving a location reporting trigger from a first vertical application layer (VAL) server or a second location management client of the SEAL at a second UE;
initiating a location reporting process to obtain third location information of the first UE in response to the location reporting trigger being received; and
transmitting a third location information report to the first VAL server or the second location management client of the SEAL at the second UE, the third location information report including the third location information of the first UE and a third timestamp corresponding to the third location information of the first UE.

11. The method of claim 10, wherein the location reporting process is an on-demand location reporting process or an event-triggered location reporting process between the location management server and the first location management client of the SEAL at the first UE, depending on information of the location reporting trigger.

12. The method of claim 7, further comprising:
receiving a location information subscription request including a location information subscription configuration from one of a second VAL server and a third location management client of the SEAL at a third UE;

in response to a location information notification being triggered according to the location information subscription configuration, determining latest location information of one or more UEs including the first UE; and transmitting the location information notification to the one of the second VAL server and the third location management client of the SEAL at the third UE, the location information notification including:
an identity of the first UE,
an identity of the third UE when the location information subscription request is received from the third UE,
an identity of an event that triggered the location information notification,
the latest location information of the first UE, and
a fourth timestamp associated with the latest location information of the first UE.

13. The method of claim 12, wherein the latest location information of the first UE is determined based on location information received from the first location management client of a respective one of the one or more UEs or from a core network of a wireless communication network.

14. The method of claim 7, wherein a type of the first location information identified in the location reporting configuration is one of:
an E-UTRA cell global identifier (ECGI),
a multimedia broadcast multicast services service area identity (MBMS SAI), and
geographic coordinates.

15. A non-transitory computer-readable medium storing instructions that, when executed by a processor, cause the processor to perform a method of a service enabler architecture layer (SEAL), the method comprises:
receiving a location reporting configuration at a first user equipment (UE) from a location management server of the SEAL, the location reporting configuration indicating at least one location reporting event for triggering a first location information report from a first location management client at the first UE to the location management server; and
transmitting the first location information report to the location management server from the first location management client at the first UE in response to the at least one location reporting event occurring, the first location information report including:
an identity of the first UE,
an identity of the at least one location reporting event that triggers the first location information report,
first location information of the first UE, and
a first timestamp corresponding to the first location information of the first UE.

16. The non-transitory computer-readable medium of claim 15, wherein a format of the first timestamp corresponding to the first location information of the first UE is one of:
yyyy-month-dayTHH:MM:SS,
Monday, DD Mon YYYY HH:MM:SS TimeZone, and
yyyy-mn-ddTHH:MM:SS.

17. The non-transitory computer-readable medium of claim 15, wherein the method further comprises:
receiving a location information request from the location management server of the SEAL; and
in response to the received location information request, transmitting a second location information report to the location management server, the second location information report including second location information of the first UE and a second timestamp corresponding to the second location information of the first UE.

18. The non-transitory computer-readable medium of claim 15, wherein the method further comprises:
transmitting a location reporting trigger to the location management server to activate a location reporting process for obtaining third location information of a second location management client of the SEAL at a second UE; and
receiving a third location information report from the location management server, the third location information report including the third location information of the second UE and a third timestamp corresponding to the third location information of the second UE.

19. The non-transitory computer-readable medium of claim 15, wherein a type of the first location information identified in the location reporting configuration is one of:
an E-UTRA cell global identifier (ECGI),
a multimedia broadcast multicast services service area identity (MBMS SAI), and
geographic coordinates.

20. The non-transitory computer-readable medium of claim 15, wherein the method further comprises:
transmitting a location information subscription request including a location information subscription configuration to the location management server; and
receiving a location information notification from the location management server, the location information notification including:
an identity of a third UE,
an identity of the first UE,
an identity of an event that triggered the location information notification,
latest location information of the third UE, and
a fourth timestamp associated with the latest location information of the third UE.

* * * * *